2,885,814
HOOK BAITER

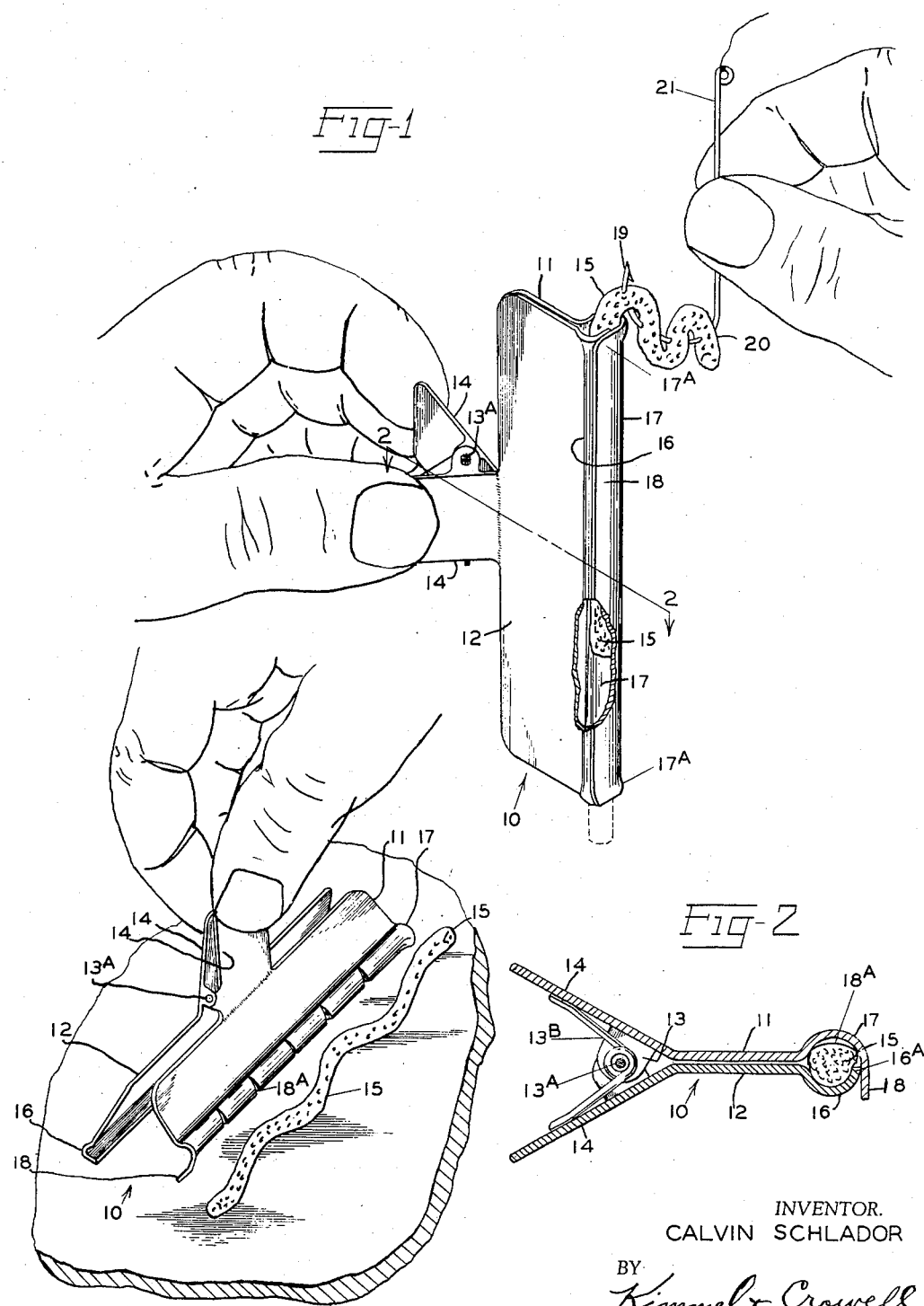

Calvin Schlador, Detroit, Oreg.

Application May 17, 1957, Serial No. 659,796

3 Claims. (Cl. 43—4)

The present invention relates to hook baiters and particularly to a device adapted for the handling of fish worms.

The primary object of the invention is to provide a device for holding fish worms while threading the worms onto the fish hooks. With this device, the worm can be picked up and held in a straight line position without the operator's hand touching the worm and by proper manipulation the hook can be threaded through the worm back and forth with a more complete control of the operation than has heretofore been possible to perform.

Other objects and advantages will become apparent in the following specification when considered in the light of the attached drawings, in which:

Figure 1 is a perspective view of the invention shown being operated by the fisherman threading a worm on a fish hook.

Figure 2 is a sectional view, taken on the line 2—2 of Figure 1, looking in the direction of the arrows, the hands having been removed.

Figure 3 is a perspective view of the device about to be applied to a worm for holding the same as illustrated in Figure 1.

Referring now to the drawings in detail wherein like reference characters indicate like parts throughout the several figures, the reference numeral 10 indicates generally a fish hook baiter constructed in accordance with the invention. The baiter 10 includes jaws 11 and 12. The jaws 11 and 12 are each provided with a pair of ears 13 arranged in aligned spaced relation and pivotally connected by a pivot pin 13a.

A coil spring 13b is carried by the pivot pin 13a for biasing the jaws 11 and 12 together. The jaws 11 and 12 have rearwardly extending handles 14 to be grasped by the fingers of an operator. On the compressing together of the handles 14, the jaws 11 and 12 separate and a worm 15 can be either grasped between curved lips 16 and 17 or removed therefrom as the case may be.

The spring 13b holds the jaws 11 and 12 and their lips 16 and 17 together, as indicated in Figures 1 and 2. The lip 17 is extended into a straight portion 18 to overlap the edge 16a of the lip 16, as best illustrated in Figure 2. This extended portion 18 makes it easier to grasp the worm 15 and hold the same when the jaws 11 and 12 are slightly open in order to permit the worm 15 to be slid within the device between the lips 16 and 17, the portion 18 preventing the worm 15 from falling out from between the lips 16 and 17.

Indentations 18a are formed within the lip 17 and prevent the worm 15 from pulling out from between the lips 16 and 17 until the handles 14 are brought towards one another, opening the jaws 11 and 12. The oppositely disposed ends of the lips 16 and 17 are flared as indicated at 17a, making it easy for the worm 15 to be pulled back and forth and entered between the lips 16 and 17.

In the operation of this new and improved fishing baiting device, the operator grasps the handles 14, as indicated in Figure 3, and brings the jaws 16 and 17 down over the worm 15 and releases the handles 14, grasping the worm 15 between the lips 16 and 17. He then holds the device as indicated in Figure 1, slightly compressing the handles 14, allowing the end 20 of the worm 15 to be pulled out through from between the lips 16 and 17 and then threading the point 19 of the hook 21 through the worm 15 as illustrated.

When the hook 21 is threaded through the worm 15, as illustrated, a slight pressure on the handles 14 again will allow the worm 15 to be pulled up further between the lips 16 and 17 of the device 10 ready to insert the point 19 of the hook in another fold of the worm 15.

Having thus described the prefered embodiment of the invention, it should be understood that numerous structural modifications and adaptations may be resorted to without departing from the scope of the appended claims.

What is claimed is:

1. A fish hook baiter comprising a pair of confronting generally parallel jaws, an integral handle formed on each of said jaws with said handles offset from their respective jaws and arranged in outwardly diverging relation to each other, means pivotally securing said jaws together, means resiliently biasing said jaws into contact with each other, an arcuate lip respectively integrally formed on each of said jaws oppositely of said handles with each of said lips curving outwardly away from the other of said jaws, said lips having concave gripping faces arranged in confronting relation, and an extension integrally formed on one of said lips generally perpendicular to said jaws projecting beyond the other of said lips, said lips having a substantially cylindrical tubular form with said jaws in contacting relation to cooperatively receive and clasp an elongated substantially cylindrical worm therebetween.

2. A device as claimed in claim 1 wherein one of said jaws is provided with friction ribs for gripping the worm.

3. A device as claimed in claim 1 wherein said arcuate lips are outwardly flared at their opposite terminal ends.

References Cited in the file of this patent

UNITED STATES PATENTS

| | | |
|---|---|---|
| 515,277 | Blair | Feb. 20, 1894 |
| 2,611,982 | Sears | Sept. 30, 1952 |
| 2,634,159 | Agneberg | Apr. 7, 1953 |